US012523264B2

(12) United States Patent
Hwang et al.

(10) Patent No.: US 12,523,264 B2
(45) Date of Patent: Jan. 13, 2026

(54) CLUTCH FOR PREVENTING BACKDRIVE

(71) Applicants: Hyundai Motor Company, Seoul (KR); Kia Corporation, Seoul (KR)

(72) Inventors: Sang Woo Hwang, Seoul (KR); Youngil Sohn, Yongin-Si (KR); Sehyun Chang, Suwon-Si (KR); Min Jun Kim, Busan (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 299 days.

(21) Appl. No.: 18/073,098

(22) Filed: Dec. 1, 2022

(65) Prior Publication Data

US 2023/0296146 A1    Sep. 21, 2023

(30) Foreign Application Priority Data

Mar. 15, 2022  (KR) .......................... 10-2022-0031736

(51) Int. Cl.
*F16D 51/12* (2006.01)
*F16D 13/12* (2006.01)
(Continued)

(52) U.S. Cl.
CPC ............. *F16D 51/12* (2013.01); *F16D 13/16* (2013.01); *F16D 27/01* (2013.01); *F16D 51/36* (2013.01);
(Continued)

(58) Field of Classification Search
CPC .......... F16D 51/10; F16D 51/12; F16D 51/22; F16D 51/32; F16D 51/34; F16D 51/36;
(Continued)

(56) References Cited

U.S. PATENT DOCUMENTS 3,335,831 A * 8/1967 Kalns .................. F16D 3/02
74/625
4,591,029 A * 5/1986 Da Foe .................... B66D 5/34
188/134
(Continued)

FOREIGN PATENT DOCUMENTS

CN          7747600 A      3/2018
CN     108869579 A *  11/2018 ............. F16D 59/02
(Continued)

OTHER PUBLICATIONS

Glenn Mathijssen, et al. "Novel Lockable and Stackable Compliant Actuation Unit for Modular + SPEA Actuators" IEEE Robotics and Automation Letters, vol. 4, No. 4, Oct. 2019.

*Primary Examiner* — Thomas J Williams
(74) *Attorney, Agent, or Firm* — MORGAN, LEWIS & BOCKIUS LLP

(57) ABSTRACT

A clutch for preventing backdrive includes a housing, a cover portion located at one end portion of the housing, an external shaft, at least a portion of which is located in the housing, and another end portion of which passes through the housing, a plurality of lockers located inside the housing and surrounding the first end portion of the external shaft, an input shaft, a first end portion of which is inserted into openings of the plurality of lockers and a second end portion of which is configured to pass through the cover portion, and a brake unit configured to be selectively engaged to the lockers to restrict rotations of the lockers. The external shaft is restricted by the lockers so that the external shaft and the lockers are rotated in a rotation direction of the input shaft, and movements of the lockers are restricted by the brake unit when the external shaft is rotated.

13 Claims, 5 Drawing Sheets

(51) Int. Cl.
*F16D 13/16* (2006.01)
*F16D 27/01* (2006.01)
*F16D 51/36* (2006.01)
*F16D 51/56* (2006.01)
*F16D 67/02* (2006.01)
*F16D 43/21* (2006.01)

(52) U.S. Cl.
CPC ............. *F16D 51/56* (2013.01); *F16D 67/02* (2013.01); *F16D 43/211* (2013.01)

(58) Field of Classification Search
CPC ...... F16D 51/56; F16D 67/02; F16D 2121/18; F16D 43/211; F16D 41/084; F16D 41/10; F16D 13/16
See application file for complete search history.

(56) References Cited

U.S. PATENT DOCUMENTS

| | | |
|---|---|---|
| 9,051,982 B2 | 6/2015 | Park et al. |
| 11,879,508 B2 * | 1/2024 | Hwang ................... F16D 27/09 |
| 2007/0023248 A1 * | 2/2007 | Nguyen ................ F16D 41/084 |
| | | 192/43 |
| 2014/0239691 A1 * | 8/2014 | Hellrung ................ B60N 2/236 |
| | | 297/354.1 |
| 2019/0271364 A1 | 9/2019 | Sakamoto |
| 2020/0284307 A1 * | 9/2020 | Williams ............ F16K 37/0041 |
| 2021/0262532 A1 * | 8/2021 | Toyoda ................... F16D 59/00 |
| 2021/0277964 A1 * | 9/2021 | Daikoku ............. F16H 25/2454 |
| 2022/0042555 A1 * | 2/2022 | Dohi ..................... F16D 43/211 |
| 2022/0060084 A1 * | 2/2022 | Kishida ................... F16D 51/50 |
| 2023/0296146 A1 * | 9/2023 | Hwang .................. F16D 51/36 |

FOREIGN PATENT DOCUMENTS

| | | | | |
|---|---|---|---|---|
| CN | 208634241 U | 3/2019 | | |
| EP | 1646817 B | 10/2007 | | |
| KR | 2002-0020760 A | 3/2002 | | |
| WO | WO 2010-120404 A | 10/2010 | | |
| WO | WO 2020-181185 A | 10/2020 | | |
| WO | WO-2021125274 A1 * | 6/2021 | ............... | F16D 3/50 |
| WO | WO-2021152980 A1 * | 8/2021 | ............... | F16D 3/02 |
| WO | WO-2021172558 A1 * | 9/2021 | ............. | G06F 30/33 |

* cited by examiner

Surface Joining

Gap for Free Rotation

Surface Restriction

CLUTCH FOR PREVENTING BACKDRIVE

CROSS REFERENCE TO RELATED APPLICATION

The present application claims priority to Korean Patent Application No. 10-2022-0031736, filed Mar. 15, 2022, the entire contents of which is incorporated herein for all purposes by this reference.

BACKGROUND OF THE PRESENT DISCLOSURE

Field of the Present Disclosure

The present disclosure relates generally to a clutch for preventing backdrive, and more particularly, a clutch for preventing backdrive of an input shaft when a driving force is not applied using a plurality of lockers formed between the input shaft and an external shaft.

Description of Related Art

Typically, a driving force is configured to be transmitted through a clutch, and a rotating force may be configured to be transmitted to a selected component from a motor or an engine to which the driving force is applied. As one example, when external torque is applied to an output stage of a gear array in a motor having a worm and a gear, there is a need to prevent the worm and the gear from entering a backdrive state.

When a motor is connected to a weight, driving torque will act on a motor output driver under a specified condition. This torque is transmitted from a drive gear to a worm shaft, and thereby can cause an angular motion on a motor armature (backdrive).

In the case of entering the present condition, components for transmitting the driving force are configured to stop operating as intended by a user. However, when backdrive occurs, the components may be configured to be rotated in the direction opposite in a direction in which the driving force is transmitted.

Generally, the backdrive condition is controlled by reducing gearing efficiency of the clutch. However, this has a problem in that the motor for driving should be replaced with a motor having a relatively large size for large capacity as well as overall system efficiency is reduced, which acts as a drawback in a drive efficiency aspect.

Therefore, a need to configure the clutch capable of selectively transmitting the rotating force to the external shaft is emerging.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a clutch configured for preventing backlash or backdrive in a state in which no driving force is applied.

Furthermore, the present disclosure is directed to propose a clutch for preventing backdrive by providing high efficiency when forward driving is performed and by maintaining a locking state of the clutch when backward driving of an input shaft is input.

Furthermore, the present disclosure is directed to propose a clutch configured so that torque inflowing into an external shaft is not applied to an input shaft in contact with an internal side of a housing in correspondence to a rotating force applied from the external shaft.

Furthermore, the present disclosure is directed to propose a clutch configured for preventing backdrive by performing precise control through lockers fastened with an input shaft.

The objectives of the present disclosure are not limited to the aforementioned description, and other objectives not explicitly included herein will be clearly understood by a person having ordinary skill in the art from the description provided hereinafter. Furthermore, the objectives of the present disclosure may be implemented by means indicated by the claims and their combination.

In various aspects of the present disclosures, according to one aspect of the present disclosure, a clutch for preventing backdrive includes the following configurations.

As an exemplary embodiment of the present disclosure, a clutch for preventing backdrive includes: a housing; a cover portion located at one end portion of the housing; an external shaft, a first end portion of which is located in the housing, and a second end portion of which externally passes through the housing; a plurality of lockers located inside the housing and surrounding the first end portion of the external shaft; an input shaft, a first end portion of which is inserted into openings of the plurality of lockers and a second end portion of which externally pass through the cover portion; and a brake unit configured to limit rotations of the lockers, wherein the external shaft is restricted by the lockers so that the external shaft and the lockers are rotated in a rotation direction of the input shaft, and movements of the lockers are limited by the brake unit when the external shaft is rotated.

Furthermore, in the clutch for preventing backdrive, the external shaft may be configured to be surface-joined with the plurality of lockers according to rotation of the input shaft.

Furthermore, in the clutch for preventing backdrive, each of the lockers may further include: a pressing protrusion which is located at an end portion adjacent to an internal circumferential surface of the housing; and an insertion groove which is located to correspond to the pressing protrusion.

Furthermore, in the clutch for preventing backdrive, the brake unit may further include: a steel portion which is located on an internal circumferential surface of the housing; and a magnetism portion which is located on an external side of at least one of the plurality of lockers that face the steel portion.

Furthermore, in the clutch for preventing backdrive, when a rotating force of the input shaft is released, the magnetism portions located at the plurality of lockers may be located adjacent to the steel portion.

Furthermore, the clutch for preventing backdrive may further include a braking portion which is located adjacent to the steel portion and is configured to selectively abut the plurality of lockers, wherein, when magnetism portions come adjacent to the steel portion, external circumferential surfaces of the plurality of lockers may be configured to abut the braking portion.

Furthermore, in the clutch for preventing backdrive, when a rotating force of the input shaft is released, one end portion of the input shaft which is located at the plurality of lockers may be configured to be constricted by the opening.

Furthermore, in the clutch for preventing backdrive, when a rotating force of the input shaft is released, one end portion of the input shaft which is located at the plurality of lockers may be configured to be constricted by the opening.

Furthermore, in the clutch for preventing backdrive, when a rotating force of the input shaft is released, the plurality of lockers may be moved to positions adjacent to an internal circumferential surface of the housing, and one end portion of the input shaft may abut one surfaces of the openings of the plurality of lockers to restrict the movement of the input shaft.

Furthermore, in the clutch for preventing backdrive, a cross section of the housing may have a shape of a circle, and the plurality of lockers may be configured to be divided into four portions based on a central axis of the external shaft.

Furthermore, in the clutch for preventing backdrive, the lockers made up of four portions may have the same angle as each other based on the central axis of the external shaft.

Furthermore, in the clutch for preventing backdrive, the input shaft may include: rotation transmission portions that are inserted into the openings formed in the plurality of lockers; and a drive transmission portion that protrudes outward the cover portion and transmits a driving force of the driver.

Furthermore, in the clutch for preventing backdrive, when a driving force of the input shaft is not applied, one surface of the opening adjacent to the external shaft may be configured to abut the rotation transmission portions to regulate movement of the input shaft.

Furthermore, in the clutch for preventing backdrive, when a driving force of the input shaft is applied, the plurality of lockers may be separated from the internal circumferential surface of the housing, and may be located to restrict the flat planes of the external shaft.

The present disclosure can obtain the following effects by combination and use relations with the exemplary embodiments mentioned above and components to be described below.

The present disclosure is configured to allow the plurality of lockers fastened with the input shaft to selectively abut the braking portion located on an internal surface of a housing, providing an effect configured for precisely preventing backlash or backdrive.

Furthermore, in the present disclosure, the plurality of lockers cooperate with the input shaft to be configured to transmit a driving force to the external shaft, and high energy transfer efficiency is provided.

Furthermore, in a backlash or backdrive state in which reverse input of the input shaft is applied, the rotation of the input shaft may be restricted, which provides an effect in which precise position control is possible.

Moreover, the clutch in which no rotation force is transmitted to the input shaft in correspondence to application of torque from the external shaft, and has an effect of improving durability.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
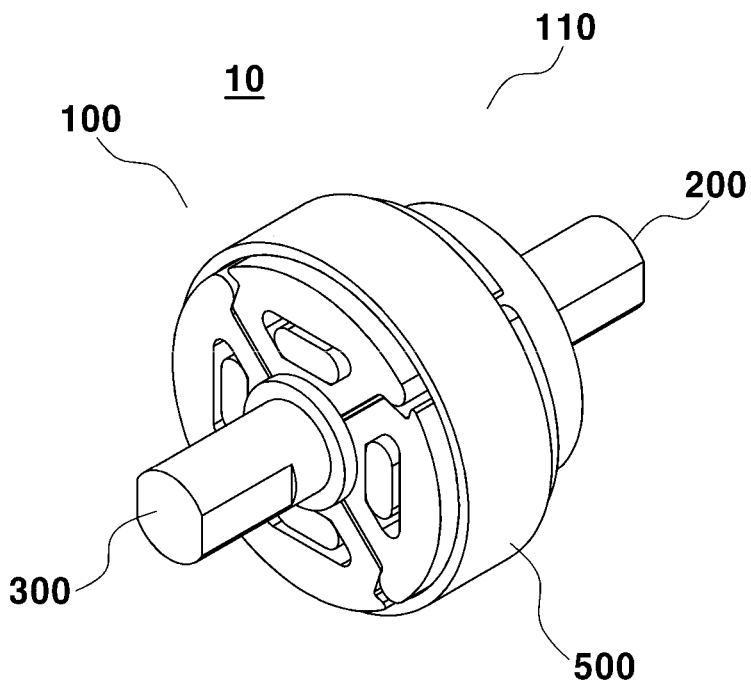
FIG. 1 illustrates a perspective view of a clutch for preventing backdrive as an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail with reference to the accompanying drawings. The exemplary embodiments of the present disclosure may be modified in various forms, and the scope of the present disclosure may not be interpreted as being limited to the following embodiments. The exemplary embodiments are provided to those having ordinary knowledge in the field of art to which the present disclosure belongs to more completely describe the present disclosure.

Furthermore, the term "section", "unit", "module", or the like described herein refers to a unit of processing one function or operation. This may be implemented by hardware, software, or a combination of the hardware and the software.

Furthermore, the terms used herein is used to merely describe specific embodiments, and are not intended to limit the embodiments. Unless otherwise indicated, the singular expression includes the plural expression.

Furthermore, the names of the components used herein include input, output, etc., which are for discrimination because of the relation in which the names of the components are equal to each other. In the following description, the names are not necessarily limited to the order thereof.

Hereinafter, the exemplary embodiments will be described in detail with reference to the appended drawings. In making description with reference to the appended drawings, the identical or corresponding constitutional element is provided the same reference number, and duplicated description thereof will be omitted.

Furthermore, "backdrive" used as one phenomenon in the present disclosure may be interpreted to have the same meaning as "backlash", and backdrive refers to a state in which the clutch moves in a direction opposite to a rotation direction in a state in which no driving force is applied to an input shaft 200.

Moreover, the clutch 10 for preventing backdrive of the present disclosure may be fastened with all the components configured for applying the rotating force to the input shaft 200. In an exemplary embodiment of the present disclosure, the input shaft 200 is configured to be fastened with a motor, and the motor is configured so that a rotating force of a clockwise direction may be applied.

Figure 2:
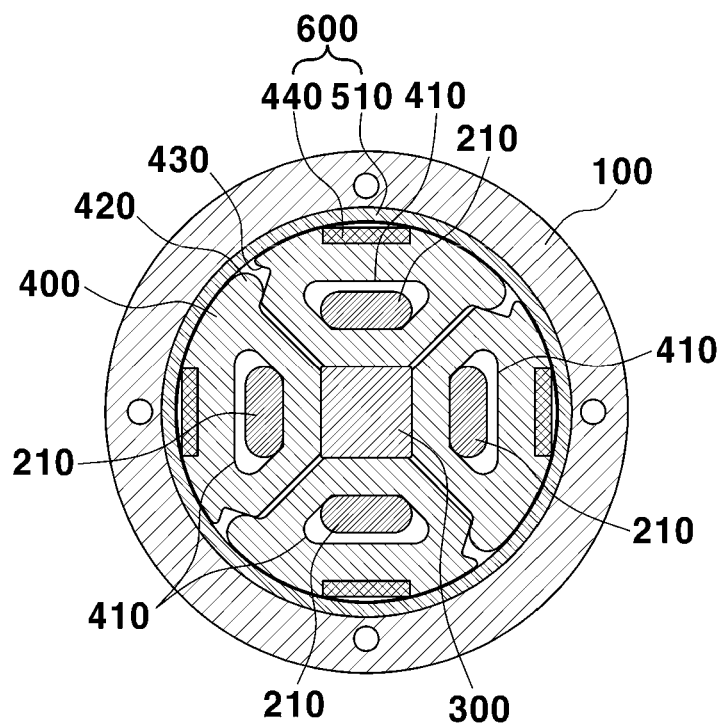
FIG. 2 illustrates a front view of the clutch for preventing backdrive as the exemplary embodiment of the present disclosure.
Figure 3:
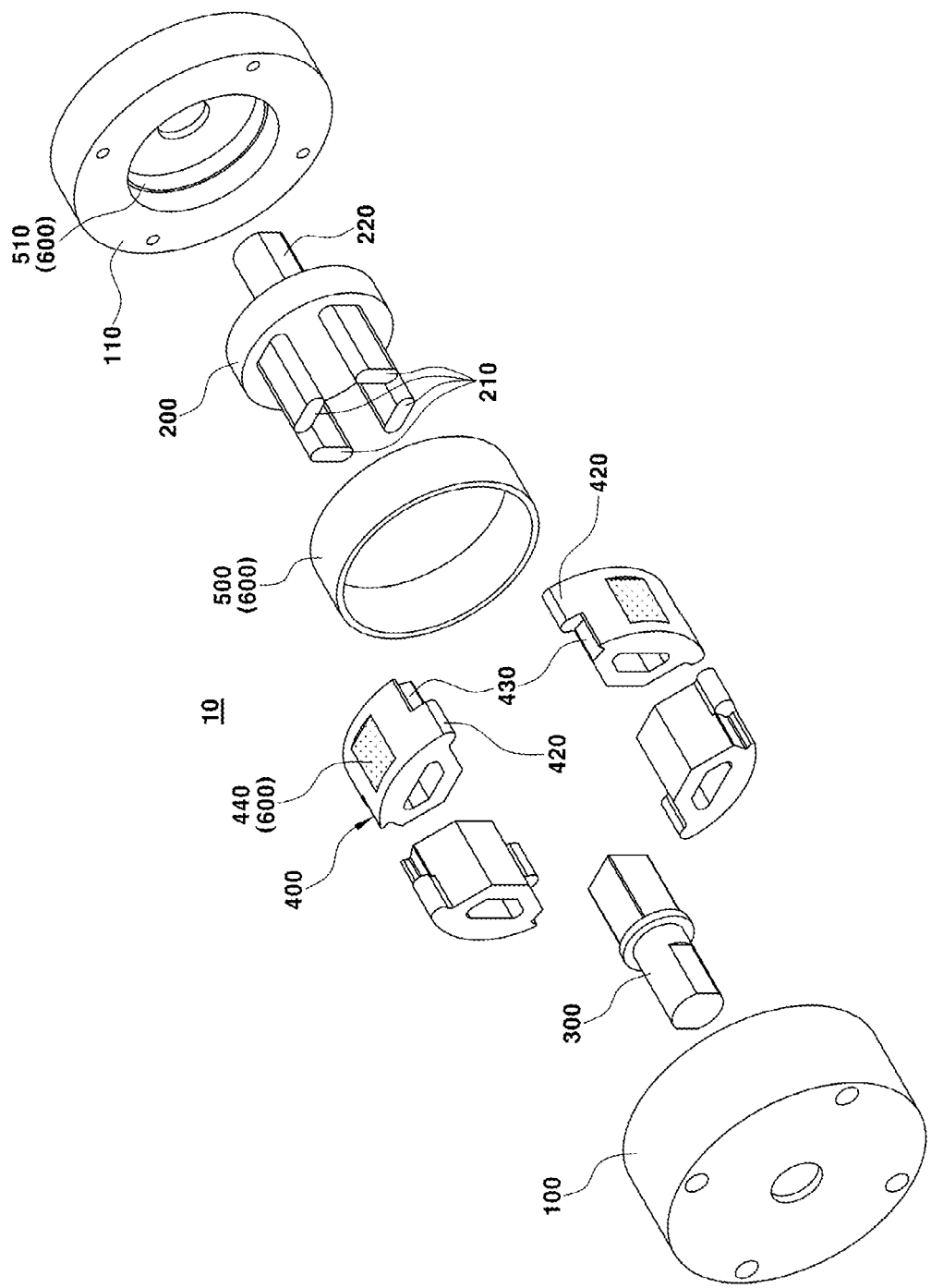
FIG. 3 illustrates a configuration view of the clutch for preventing backdrive as the exemplary embodiment of the present disclosure.

FIG. 1, FIG. 2, and FIG. 3 illustrate a configuration relation of the clutch 10 for preventing backdrive as an exemplary embodiment of the present disclosure.

As illustrated, the clutch 10 for preventing backdrive includes a housing 100, and a cover portion 110 configured to enclose one end portion of the housing 100 at the one end portion of the housing 100. The housing 100 has a circular cross section, and the cover portion 110 is configured so that an entire opening of the one end portion of the housing 100 is enclosed.

The clutch 10 includes an external shaft 300 that passes through the other end portion of the housing 100 and has at least one flat plane. The clutch 10 includes a plurality of lockers 400, which is configured to enclose the flat plane of the external shaft 300 on an internal side of the housing 100, and an input shaft 200 that includes one end portion inserted inside an opening 410 located in each of the lockers 400. The external shaft 300 has flat planes corresponding to the number of the plurality of lockers 400 located on the internal side of the housing 100. The external shaft 300 of the present disclosure may have four flat planes corresponding to the four lockers 400. Moreover, when the rotating force of the input shaft 200 is applied, the flat planes located at the external shaft 300 are configured to be joined with the plurality of lockers 400 adjacent thereto. Thus, the lockers 400 and the external shaft 300 may be configured selectively to come in surface-contact with each other.

The input shaft 200 includes a drive transmission portion 220 which is configured so that at least a portion thereof in a longitudinal direction is inserted into opening 410 located at each of the lockers 400, and so that the other end portion thereof passes through the cover portion 110 and protrudes to the external side of the cover portion 110. The drive transmission portion 220 is configured to be fastened with a driver that applies a rotating force and to be integrally rotated with the rotation direction of the driver.

Moreover, the input shaft 200 is configured so that the rotating force of the driver is applied to the drive transmission portion 220 located at the other end portion of the input shaft 200 and so that the driving force applied to the drive transmission portion 220 rotates the external shaft 300 through the rotation transmission portion 210. The driver is configured to transmit a driving force by which the input shaft 200 may be rotated and is configured so that the plurality of lockers 400 are subjected to surface joining with the flat planes of the external shaft 300 in correspondence to the rotating force of the input shaft 200. In an exemplary embodiment of the present disclosure, the driver fastened with the input shaft 200 may be configured as a motor.

Furthermore, the clutch 10 of the present disclosure includes all types of clutches 10 which may be configured to be fastened with the motor, and may be located at one end portion of a motor configured to apply a driving force of a vehicle, one end portion of a motor that performs upward and downward movement of a window, one end portion of a motor that performs input of a steering angle of an independent corner module, and one end portion of a pose control drive motor configured for controlling a vehicle body. Furthermore, the clutch 10 may be fastened with an engine as a driver, and is formed to transmit a driving force in one direction between a gear section of a transmission and an engine.

The input shaft 200 includes rotation transmission portions 210 that are inserted into the openings 410 formed in the plurality of lockers 400 respectively. In an exemplary embodiment of the present disclosure, the input shaft 200 includes four rotation transmission portions 210 corresponding to the four lockers 400. The rotation transmission portions 210 can maintain a state in which they are inserted into the openings 410 formed in the plurality of lockers 400, respectively. Moreover, the rotation transmission portion 210 is rotated in the same direction as the rotation direction of the drive transmission portion 220, and the lockers 400 coming into contact with the rotation transmission portions 210 through the openings 410 are configured to be integrally rotated in correspondence to the rotation direction of the input shaft 200.

When the rotating force of the external shaft 300 is applied into the clutch, the brake unit 600 located on the internal side of the housing 100 of the clutch 10 is configured to regulate movements of the plurality of lockers, and is configured so that the rotating force of the external shaft 300 is not transmitted to the input shaft 200. The brake unit 600 of the present disclosure includes magnetism portions 440, each of which is located on the outermost side of each of the lockers 400, a steel portion 500 which is located on an internal circumferential surface of the housing 100 and is configured at positions corresponding to the magnetism portions 440, and a braking portion 510 which is configured to selectively come into contact with the lockers 400 at a position adjacent to the steel portion 500.

The plurality of lockers 400 is located at the internal side of the housing 100, and may be located adjacent to the flat planes of the external shaft 300. The plurality of lockers 400 are located divided into at least two or more numbers, and are located to have a preset interval between the flat planes of the external shaft 300 and the housing 100. The flat planes of the external shaft 300 have the same number as the lockers 400, and the internal sides of the lockers 400 may be located adjacent to the flat planes of the external shaft 300.

Furthermore, when the rotating force of the input shaft 200 is applied, one internal end portion of each of the lockers 400 is configured to abut the flat plane formed on the external shaft 300, and is separated to have a preset interval from an internal circumferential surface of the housing 100, so that, without interference of the internal circumferential surface of the housing 100, the input shaft 200, the lockers 400, and the external shaft 300 may be configured to be integrally rotated.

The steel portion 500 is configured to be included inside the internal circumferential surface of the housing 100, and the magnetism portions 440 is configured to be included inside an external circumferential surface of at least one of the lockers 400. When the rotating force of the input shaft 200 is released, the magnetism portions 440 of the lockers 400 may be moved to positions adjacent to the internal circumferential surface of the housing 100. Moreover, the brake unit 600 includes a braking portion 510 located adjacent to the internal circumferential surface of the housing 100 in the proximity of the steel portion 500. Thus, the external circumferential surfaces of the lockers 400 are moved to positions coming into contact with the braking portion 510 by a magnetic force, and restricting the movement of the input shaft 200.

Furthermore, even in the case where the rotating force of the external shaft 300 is applied, the flat planes of the external shaft 300 push the plurality of lockers 400 in a radial direction, so that the braking portion 510 located on the internal circumferential surface of the housing 100 is configured to be fixed by coming into contact with the external circumferential surfaces of the lockers 400. Thus, the rotating force of the external shaft 300 may be prevented from being transmitted to the input shaft 200. The braking portion 510 may be formed at a position which is more adjacent to the lockers 400 in comparison with the steel portion 500, so that the magnetism portions 440 of the lockers 400 are configured to prevent direction contact with the steel portion 500.

The internal circumferential surface of the housing 100 may be configured to form a preset interval according to the positions of the lockers 400. Thus, the circumferential surfaces of the lockers 400 are configured to be moved to positions adjacent to the internal circumferential surface of the housing 100 by magnetic forces of the magnetism portions 440 in a state in which the driving force of the input shaft 200 is released, and are located so that the interval from the internal circumferential surface of the housing 100 is minimized.

In contrast, when the input shaft 200 is rotated, the rotation transmission portion 210 of the input shaft 200 is located in contact with one end portion of each of the lockers 400 in a width direction of the opening 410, and each of the lockers 400 can apply a rotating force to be rotated in the direction of the rotating force of the driver. In the instant case, the plurality of lockers 400 are located to abut with the flat planes of the external shaft 300, so that an interval between the internal circumferential surface of the housing 100 and the external circumferential surface of each of the lockers 400 is converted into a maximum state. Thus, the lockers 400 correspond to the rotation of the input shaft 200, and are located in a state in which they perform surface constrict on the external shaft 300 without generating a reaction force from the housing 100.

In the present manner, the clutch 10 for preventing backdrive of the present disclosure may be configured so that the lockers 400 are separated from the internal circumferential surface of the housing 100 in correspondence to the input shaft 200 rotated in a direction identical to the rotation direction applied from the driver, and the external shaft 300 is integrally rotated. When the rotating force applied to the input shaft 200 is released, the braking portion 510 and the lockers 400 are configured so that they come into contact with each other, and limit the movement of the input shaft 200 to prevent a backdrive phenomenon.

Figure 4:
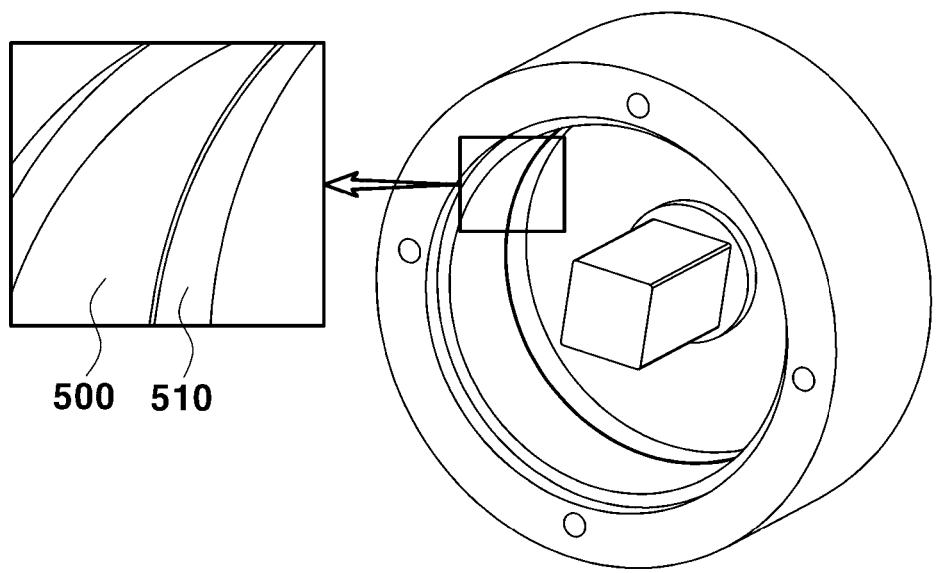
FIG. 4 illustrates a configuration view of a braking portion and a steel portion of the clutch for preventing backdrive as the exemplary embodiment of the present disclosure.

FIG. 4 illustrates a configuration of the steel portion 500 located on the internal circumferential surface of the housing 100, and a configuration of the braking portion 510 located adjacent to the steel portion 500.

The steel portion 500 is provided to the internal circumferential surface of the housing 100 to correspond to the magnetism portions 440 located outside the plurality of lockers 400. Thus, when the rotating force of the input shaft 200 is released, the lockers 400 is configured to move to a position adjacent to the steel portion 500 of the housing 100 by a magnetic force. Simultaneously, the external sides of the lockers 400 may be configured to come into contact with the braking portion 510, and restrict movements of the lockers 400 and the input shaft 200.

Furthermore, the braking portion 510 located adjacent to the steel portion 500 may be located relatively adjacent to the center portion of the housing 100 in comparison with the steel portion 500. Thus, because the braking portion 510 is moved to a position adjacent to the steel portion 500, when the lockers 400 are moved to a position adjacent to the steel portion 500 in correspondence to a magnetic force, the external sides of the lockers 400 are configured to abut the braking portion 510.

As illustrated, in an exemplary embodiment of the present disclosure, the clutch 10 may include the braking portion 510 having a preset step from the steel portion 500, and the braking portion 510 may be located at at least a portion of the housing 100 in the longitudinal direction based on the steel portion 500. The clutch 10 may include the braking portion 510 which is located at at least a portion of the steel portion 500 in the longitudinal direction, and is configured to surround the internal circumferential surface of the housing 100.

Thus, even in the case where the lockers 400 are moved to a position most adjacent to the internal circumferential surface of the housing 100, the magnetism portions 440 and the steel portion 500 are configured not to come into contact with each other, and the braking portion 510 and the lockers 400 are configured to provide a repulsive force in a contact state.

Figure 5:
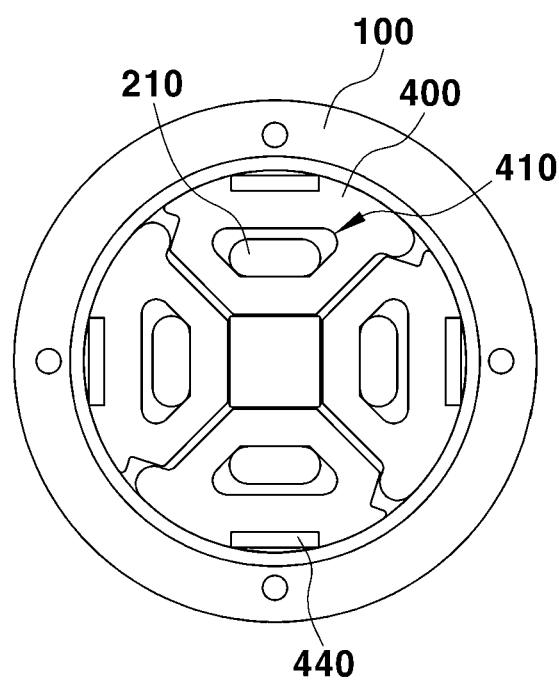
FIG. 5 illustrates a configuration view of the clutch for preventing backdrive in a state in which the driving force of the input shaft is released as the exemplary embodiment of the present disclosure.

In FIG. 5, a configuration relation between the internal circumferential surfaces of the housing 100 and the plurality of lockers 400 according to the rotation of the external shaft 300 in a state where the driving force is released from the input shaft 200 is illustrated.

As illustrated, the lockers 400 may be configured inside the housing 100 in a four number. Each of the four lockers 400 includes an opening 410. The rotation transmission portion 210 of the input shaft 200 is located inside the opening 410. Moreover, the four lockers 400 may be divided into four pieces to have the same angle based on the central axis of the external shaft 300.

When the driving force of the input shaft 200 is released, the clutch 10 is moved to a position adjacent to the steel portion 500, which is located on the internal circumferential surface of the housing 100, by the magnetic forces of the magnetism portions 440 located outside the lockers 400. When the lockers 400 are moved to positions adjacent to the internal circumferential surface of the housing 100, the rotation transmission portion 210 of the input shaft 200 inserted into the opening 410 is converted into a state that comes into contact with one surface of the opening 410 located adjacent to the external shaft 300. Moreover, the external surfaces of the lockers 400 are configured to come into contact with the braking portion 510 located inside the housing 100, and to restrict the rotations of the lockers 400.

In the state in which the rotations of the lockers 400 are restricted, the rotation of the rotation transmission portion 210 located inside the opening 410 is restricted, and thereby the backdrive of the input shaft 200 is configured to be restricted. Moreover, the lockers 400 may be separated to have preset intervals from the flat planes of the external shaft 300.

In the present manner, depending on the magnetic force, the lockers 400 may be configured to be converted into a state adjacent to the internal circumferential surface of the housing 100 and to restrict the rotation motion of the input shaft 200 as the braking portion 510 comes into contact with the external surfaces of the lockers 400. That is, the lockers 400 and the braking portion 510 may be maintained in a state in which they come into contact with each other so that the rotation of the input shaft 200 is restricted in a state in which the rotation force of the input shaft 200 is released.

Figure 6A:
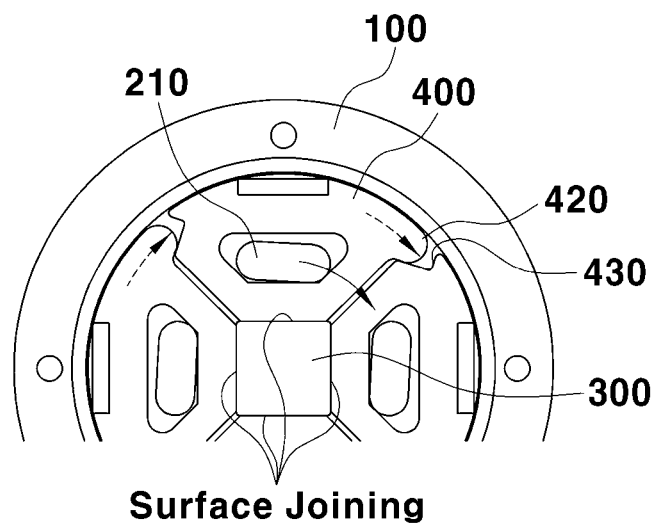
FIG. 6A illustrates a configuration view of the driving force to the lockers in which the driving force of the input shaft is applied as an exemplary embodiment of the present disclosure.
Figure 6B:
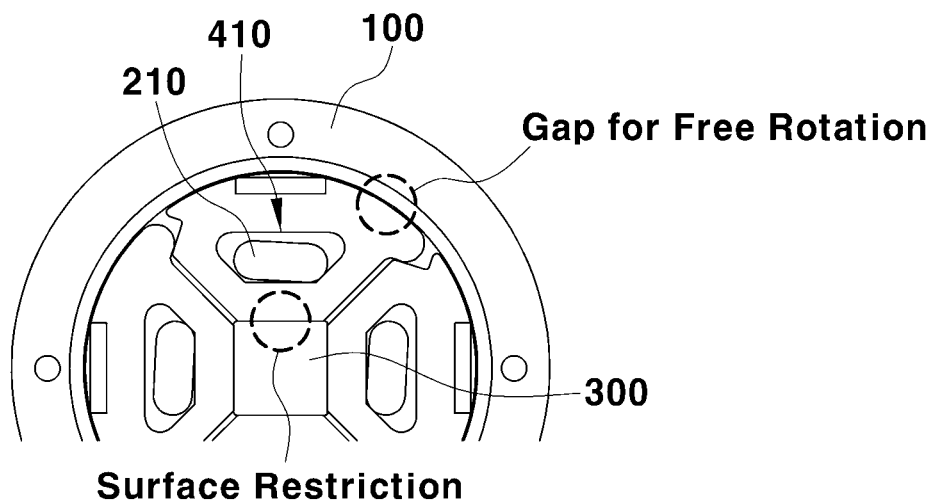
FIG. 6B illustrates a configuration view of the clutch for preventing backdrive in a state in which the driving force of the input shaft is applied as an exemplary embodiment of the present disclosure.
Figure 6C:
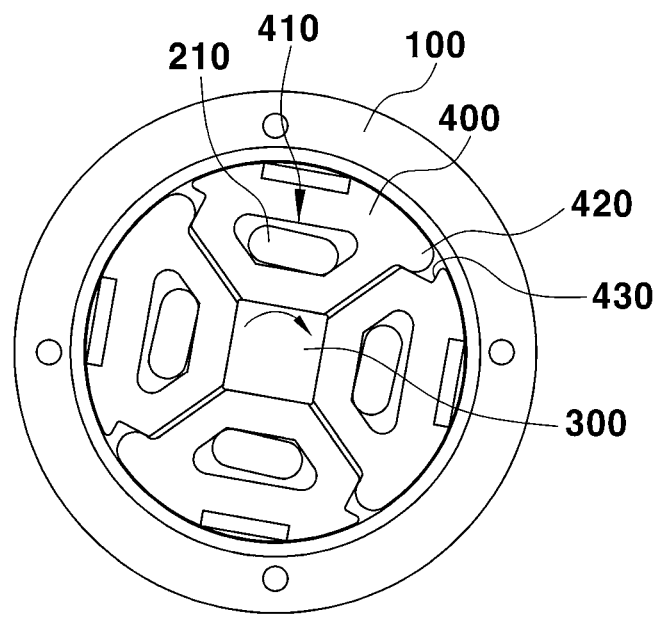
FIG. 6C illustrates an operation view in which the external shaft is rotated in a state in which the driving force of the input shaft is applied as an exemplary embodiment of the present disclosure.

In contrast, FIG. 6A, FIG. 6B, and FIG. 6C illustrate configurations in which the rotation force of the input shaft 200 is applied to allow the lockers 400 and the external shaft 300 to be integrally rotated.

As illustrated in FIG. 6A, when a rotating force of the motor as the driver fastened with the drive transmission portion 220 of the input shaft 200 is applied to the input shaft 200, the rotation transmission portion 210 of the input shaft 200 located in the opening 410 of each of the lockers 400 is configured to press the opening 410 according to the rotation direction of the input shaft 200 for the first time.

The pressed openings 410 move the plurality of lockers 400 so that the external sides of the lockers 400 are separated from the braking portion 510 of the housing 100, and thus the plurality of lockers 400 are separated from the internal circumferential surface of the housing 100, and are converted into a rotatable state.

The opening 410 has a trapezoidal shape in which the major side thereof is formed at a position adjacent to the external circumferential surface of the housing 100, and is configured so that a side inclined surface of the trapezoidal shape is pressed by the rotation force of the rotation transmission portion 210. it is configured so that a force is applied to the lockers 400 in a tangential direction in which the inclined surface and the rotation transmission portion 210 abut each other. The force applied to the inclined surface is made up of a resultant force of a horizontal force, by which the lockers 400 restrict the flat planes of the external shaft 300, and a horizontal force, by which the lockers 400 are configured to be rotated.

Moreover, as illustrated, an exemplary embodiment of the present disclosure which is made up of four lockers 400 is configured so that the rotation transmission portions 210 that are inserted into and located in the openings 410 are rotated in the same direction, and that the rotation transmission portions 210 come into contact with one end portion of each of the openings 410 and apply a rotating force to the lockers 400 in the same direction.

Furthermore, the clutch includes pressing protrusions 420 that are located at one end portions of the lockers 400 and are located at lateral opposite end portions of the lockers 400 which are adjacent to the internal circumferential surface of the housing 100. Moreover, each locker 400 including the pressing protrusions 420 includes insertion grooves 430 that are configured to allow the pressing protrusions 420 to be inserted into the neighboring locker 400. The pressing protrusions 420 are located in the insertion grooves 430 to overlap each other in a longitudinal direction thereof. The insertion groove 430 corresponding to the pressing protrusion 420 and the pressing protrusion 420 corresponding to the insertion groove 430 are formed in the lockers 400 adjacent to each other, so that the neighboring lockers 400 may be configured to be fastened with each other.

The plurality of lockers 400 including the pressing protrusions 420 and the insertion grooves 430 are configured to be mutually fastened with each other. Here, due to the configuration of the magnetism portions 440 located at at least one locker 400, when the pertinent locker 400 is moved adjacent to the internal circumferential surface of the housing 100, all the lockers 400 fastened with each other may be configured to be moved integrally.

Furthermore, when the rotating forces of the rotation transmission portions 210 are applied, the pressing protrusions 420 apply a force to the lockers that are adjacent in a direction in which the lockers 400 abut the flat planes of the external shaft 300. In an exemplary embodiment of the present disclosure, when the input shaft 200 is rotated, the lockers 400 are configured to undergo surface joining with the respective planes of the external shaft 300 including four flat planes.

Thus, when the openings 410 of the lockers 400 are pressed by the rotation transmission portions 210, the pressing protrusions 420 of the lockers 400 are configured to be inserted into the insertion grooves 430 of the neighboring lockers 400, so that they are fastened with each other. That is, the pressing protrusions 420 are configured to surface-press the neighboring insertion grooves 430, and the surface-pressed lockers 400 are configured to move the lockers 400 that are adjacent to each other in a direction abutting the plurality of parallel planes of the external shaft 300.

In the present manner, when the input shaft 200 is rotated, each locker 400 presses the neighboring locker 400, and applies a force to the neighboring locker 400 in the same direction as a rotating direction thereof. Furthermore, the clutch includes the pressing protrusions 420 and the insertion grooves 430 to be configured to press the neighboring locker 400 so that the internal side of the locker 400 comes into contact with the flat plane of the external shaft.

As illustrated in FIG. 6B, when the locker 400 is configured to abut the flat plane of the external shaft 300 to perform surface constraint of the external shaft 300 and when the lockers 400 adjacent to each other are at least partially surface-joined, the flat planes of the external shaft are located to abut the plurality of lockers 400. Moreover, the internal circumferential surface of the housing 100 and the external circumferential surfaces of the lockers 400 are configured to be located to be apart from each other.

Thus, the rotating force of the input shaft 200 which is applied to the rotation transmission portion 210 is configured to be transmitted to the lockers 400 and the external shaft 300 without interference of the internal circumferential surface of the housing 100.

As in FIG. 6C, afterwards, according to the rotating force of the input shaft 200, the input shaft 200, the plurality of lockers 400, and the external shaft 300 are configured to be integrally rotated.

Thus, in correspondence to the clockwise rotation in the figure, the rotating force of the input shaft 200 is configured to be transmitted to the external shaft 300.

Figure 7:
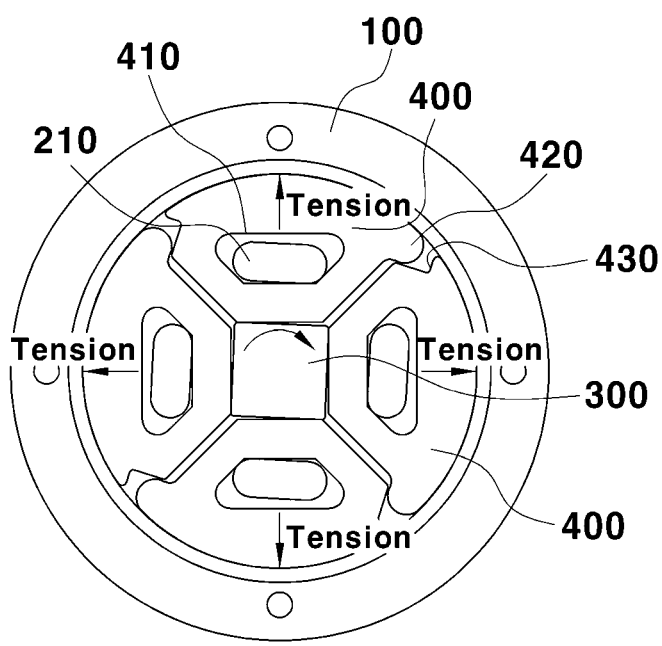
FIG. 7 illustrates a configuration view of a clutch for preventing backdrive in a state in which the driving for of the external shaft is applied as an exemplary embodiment of the present disclosure.

FIG. 7 illustrates a driving relation of the clutch 10 for preventing backdrive when a rotating force is applied to the external shaft 300 in a state in which a rotating force of the input shaft 200 is released.

As illustrated, when the external shaft 300 is rotated, a force is provided so that the lockers 400 located adjacent to the external shaft 300 are pushed in a radial direction of the housing 100, and the lockers 400 are configured to abut the braking portion 510 located on the internal circumferential surface of the housing 100 to restrict the rotation of the lockers 400.

That is, torque caused by the rotating force applied to the external shaft 300 is applied to the lockers 400 to be moved in the radial direction of the housing 100, and the lockers 400 and the braking portion 510 abut each other according to the applied force. Moreover, the movements of the lockers 400 are configured to be restricted through the rotating force of the external shaft 300 as well as the magnetic force formed between the magnetism portions 440 and the steel portion 500. Therefore, due to a reaction force formed between the braking portion 510 and the lockers 400, the rotating force applied to the external shaft 300 is configured to be offset, and the torque introduced from the external shaft 300 is configured to not be transmitted to the input shaft 200.

In summary, when only rotation of the same direction as the driving force to which the input shaft 200 is applied from the driver is transmitted to the external shaft 300, or when the input shaft 200 is rotated in a direction other than the rotation direction from the driver in a state in which the driving force is released, or when a rotating force is applied to the clutch 10 from the external shaft 300, the present disclosure is configured so that the rotating force is offset by the reaction force of each locker 400, and provides a coupling relation between the components for preventing backdrive.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A clutch for preventing backdrive, the clutch comprising:
    a housing;
    a cover portion located at one end portion of the housing;
    an external shaft, a first end portion of which is located in the housing, and a second end portion of which externally passes through the housing;
    a plurality of lockers located inside the housing and surrounding the first end portion of the external shaft;
    an input shaft, a first end portion of which is inserted into openings of the plurality of lockers and a second end portion of which externally pass through the cover portion; and
    a brake unit configured to be selectively engaged to the lockers to restrict rotations of the lockers,
    wherein the external shaft is restricted by the lockers so that the external shaft and the lockers are rotated in a rotation direction of the input shaft, and movements of the lockers are restricted by the brake unit when the external shaft is rotated,
    wherein neighboring lockers among the plurality of lockers are configured to be fastened with each other when the input shaft is rotated,
    wherein each of the lockers further includes a pressing protrusion which is located at an end portion adjacent to an internal circumferential surface of the housing, and
    wherein each of the lockers further includes an insertion groove which is located to correspond to the pressing protrusion.

2. The clutch of claim 1, wherein the external shaft is configured to be surface-joined with the plurality of lockers according to rotation of the input shaft.

3. The clutch of claim 1, wherein, when a rotating force of the input shaft is released, the first end portion of the input shaft which is located at the plurality of lockers is configured to be constricted by the openings.

4. The clutch of claim 1, wherein, when a rotating force of the input shaft is released, the plurality of lockers are moved to positions adjacent to an internal circumferential surface of the housing, and the first end portion of the input shaft abuts one surfaces of the openings of the plurality of lockers to restrict movement of the input shaft.

5. The clutch of claim 1, wherein a cross section of the housing has a shape of a circle, and the plurality of lockers are formed to be divided into four portions based on a central axis of the external shaft.

6. The clutch of claim 5, wherein the lockers made up of four portions have a same angle as each other in a circumferential direction based on the central axis of the external shaft.

7. The clutch of claim 1,
    wherein the first end portion of the input shaft includes rotation transmission portions that are inserted into the openings formed in the plurality of lockers, and
    wherein the second end portion of the input shaft includes a drive transmission portion that protrudes outward the cover portion and transmits a driving force of a driver.

8. The clutch of claim 7, wherein, when the driving force of the input shaft is not applied, one surface of the openings adjacent to the external shaft is configured to abut the rotation transmission portions to regulate movement of the input shaft.

9. The clutch of claim 1, wherein the external shaft includes a number of flat planes corresponding to a number of the lockers and the plurality of lockers encloses the flat planes of the external shaft.

10. The clutch of claim 9, wherein, when a driving force of the input shaft is applied, the plurality of lockers are separated from the internal circumferential surface of the housing, and are located to restrict the flat planes of the external shaft.

11. A clutch for preventing backdrive, the clutch comprising:
   a housing;
   a cover portion located at one end portion of the housing;
   an external shaft, a first end portion of which is located in the housing, and a second end portion of which externally passes through the housing;
   a plurality of lockers located inside the housing and surrounding the first end portion of the external shaft;
   an input shaft, a first end portion of which is inserted into openings of the plurality of lockers and a second end portion of which externally passes through the cover portion; and
   a brake unit configured to be selectively engaged to the lockers to restrict rotations of the lockers,
   wherein the external shaft is restricted by the lockers so that the external shaft and the lockers are rotated in a rotation direction of the input shaft, and movements of the lockers are restricted by the brake unit when the external shaft is rotated, and
   wherein the brake unit further includes:
      a steel portion which is located on an internal circumferential surface of the housing; and
      a magnetism portion which is located on an external side of at least one of the plurality of lockers that face the steel portion.

12. The clutch of claim 11, wherein, when a rotating force of the input shaft is released, the magnetism portion located at the plurality of lockers is located adjacent to the steel portion.

13. The clutch of claim 12, wherein the brake unit further includes a braking portion which is located adjacent to the steel portion and is configured to selectively abut the plurality of lockers,
   wherein, when the magnetism portion comes adjacent to the steel portion, external circumferential surfaces of the plurality of lockers are configured to abut the braking portion.

* * * * *